J. M. FRIEDLAND.
REVOLVING DOOR.
APPLICATION FILED JAN. 8, 1921.

1,417,372.

Patented May 23, 1922.
5 SHEETS—SHEET 1.

Inventor
Jacob M. Friedland,

By Royal E. Burnham,
Attorney

WITNESS:—
Chas. L. Griesbauer,

J. M. FRIEDLAND.
REVOLVING DOOR.
APPLICATION FILED JAN. 8, 1921.
1,417,372.
Patented May 23, 1922.
5 SHEETS—SHEET 2.
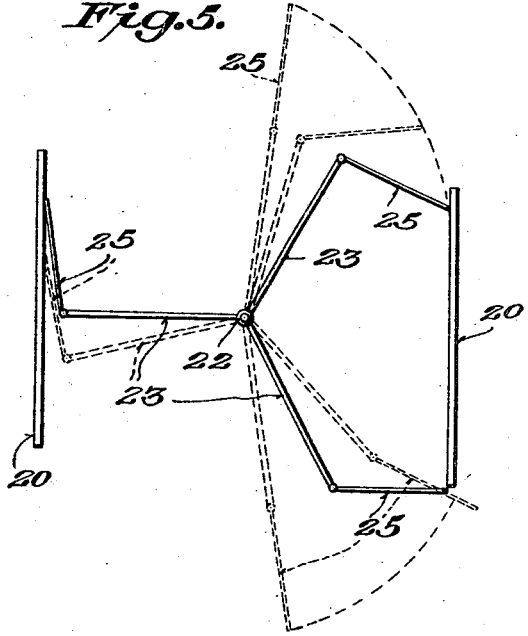
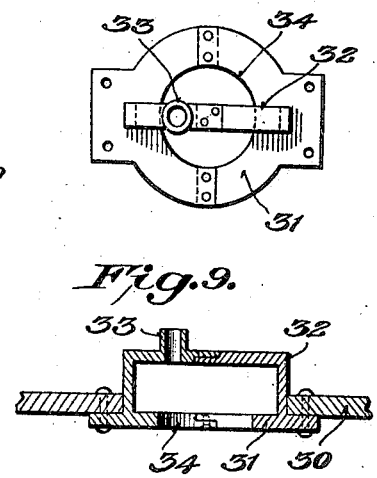
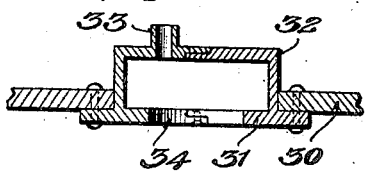
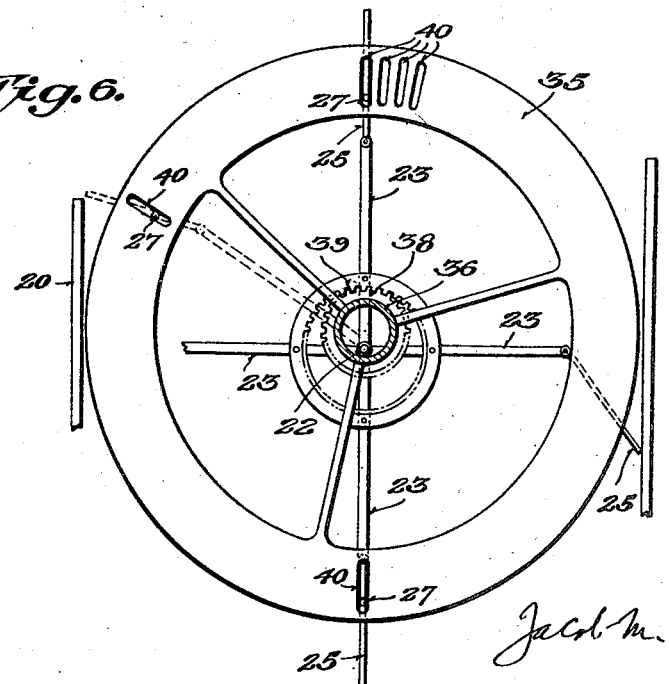
Inventor
Jacob M. Friedland,
By Royal E. Burnham,
Attorney
Witness:—
Chas. L. Griestauer

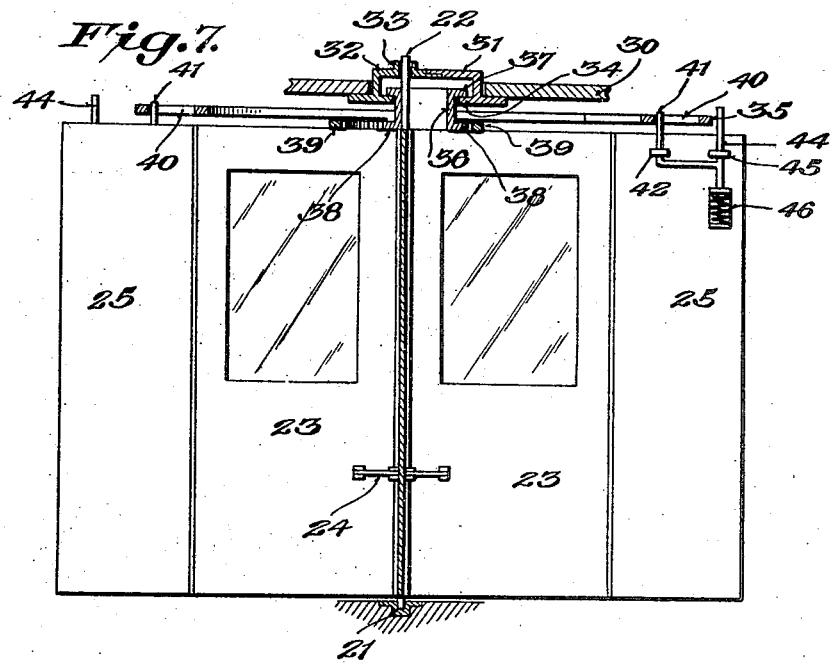
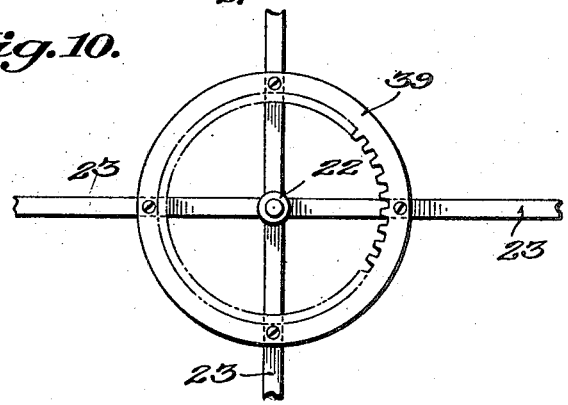
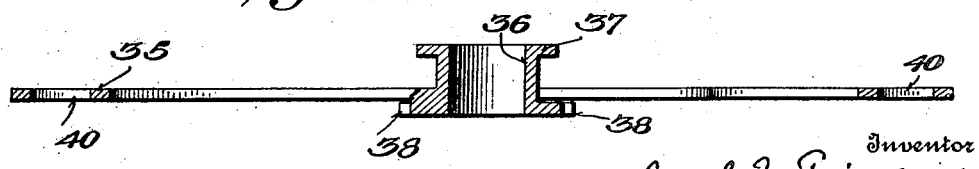

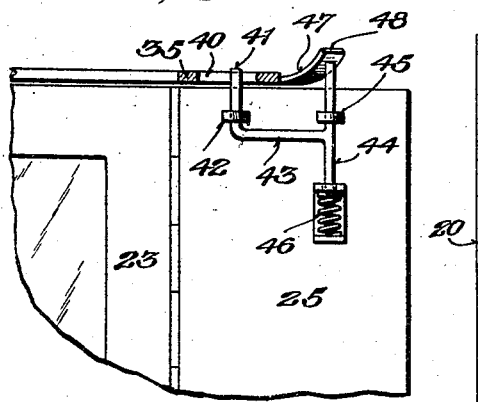
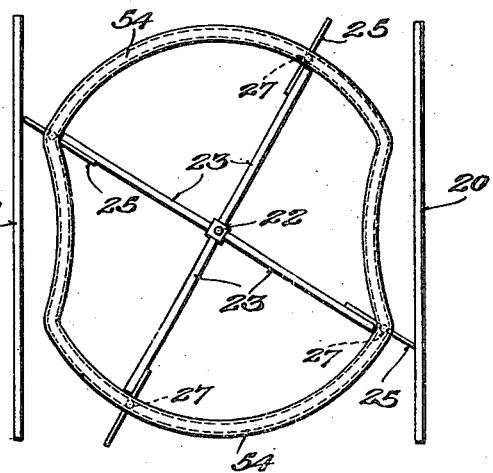
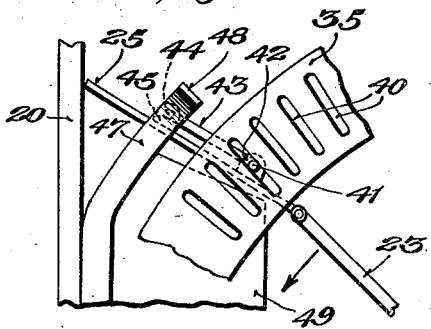
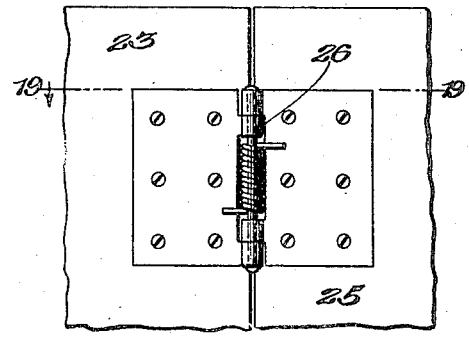
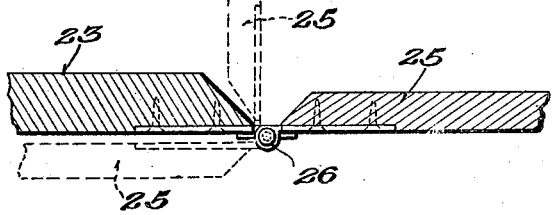

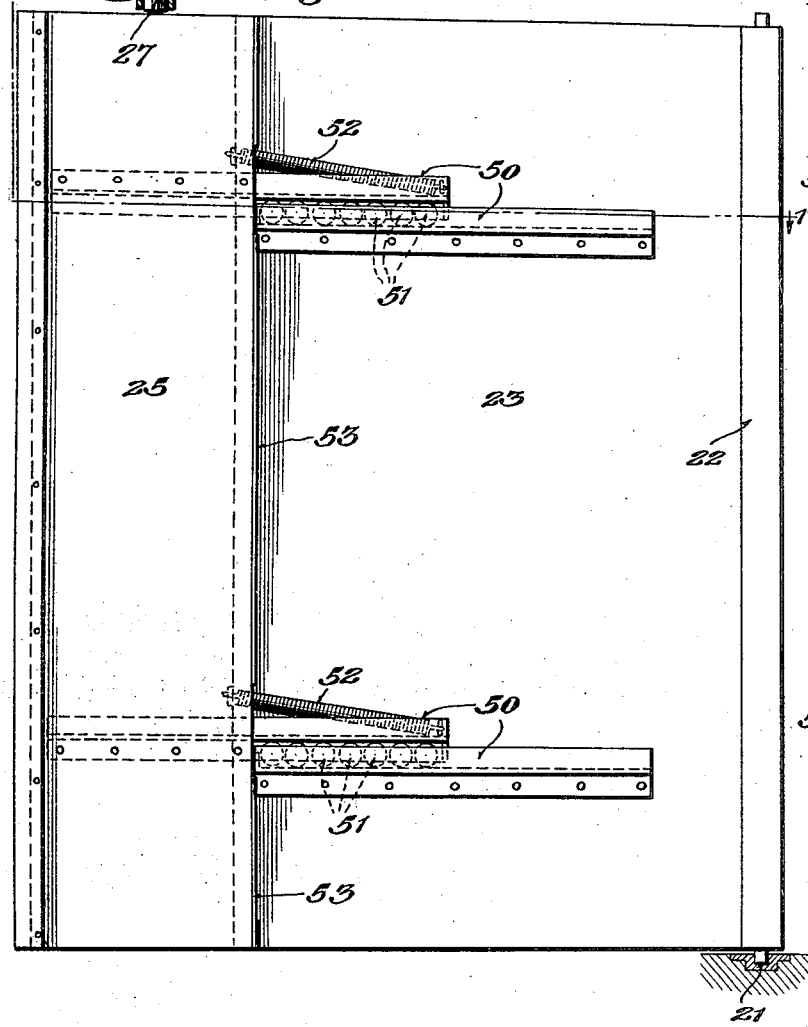
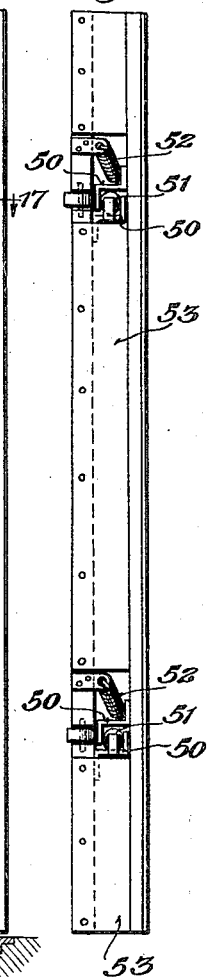
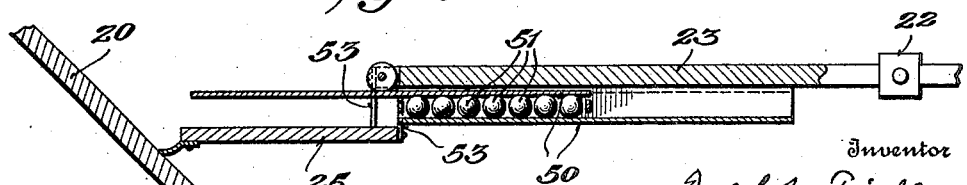

UNITED STATES PATENT OFFICE.

JACOB M. FRIEDLAND, OF NEW YORK, N. Y.

REVOLVING DOOR.

1,417,372. Specification of Letters Patent. Patented May 23, 1922.

Application filed January 8, 1921. Serial No. 435,851.

*To all whom it may concern:*

Be it known that I, JACOB M. FRIEDLAND, a citizen of the United States, residing at New York, in the county and State of New York, have invented certain new and useful Improvements in Revolving Doors, of which the following is a specification, reference being had therein to the accompanying drawings.

This invention relates to that class of closures for doorways and the like that includes radial wings revoluble about a substantially vertical axis.

It is an object of the invention to provide a door of that character that is adapted for use in cooperation with straight or substantially straight side-walls and with walls flared outwardly at their ends, as distinguished from side-walls disposed in curves concentric to the axis of revolution of the radial wings.

With this object in view, the invention provides closure members arranged to maintain closing relation with the side-walls for the periods necessary to keep the passageway at all times closed. These closure members include wings and leaves swingably or slidably mounted thereon. Means are provided for controlling movement of the leaves, so that they may maintain the proper relation to the side-walls.

Another object of the invention is to increase the period, during any given amount of movement of the wings, of closing relation of the leaves to the side-walls, one purpose of this being to permit employment of shorter side-walls than otherwise would be required.

By avoiding circular side-walls such as commonly used with revolving doors and the use instead of substantially straight or outwardly-flared side-walls, the full width of the door-opening or passageway may be utilized by persons moving therethrough; and, by thus making possible straight and direct traffic through the passageway, it is possible more completely to separate persons moving in one direction from those moving in the other and thus to avoid interference with their movement by one another.

The invention further provides a door with a less number of wings than ordinarily used, in order that more space between the wings may be available to persons carrying packages or otherwise encumbered.

Moreover, the door provided by the invention is arranged in such manner that the axis of revolution of the wings may be placed nearer one of the side walls than the other without interference with the closing action of the wings and with the weather tightness of the door.

It is still another object of the invention so to form the wings that clothing or other articles or parts that may be caught between them and a side-wall may easily be disengaged.

The details and arrangement of parts contemplated by the invention will be apparent from the accompanying drawings, forming part hereof, wherein embodiments of the invention are disclosed, for purposes of illustration.

While the disclosures herein exemplify what now are considered to be preferable embodiments of the invention, it is to be understood that it is not the intention to be limited necessarily thereto in interpretation of the claims, as modifications and adaptations within the limits of the claims can be made without departing from the nature and spirit of the invention.

Like reference-characters refer to corresponding parts in the views of the drawings, of which—

Fig. 5 is a similar view of an arrangement having a different number of wings;

Fig. 6 is a plan view of mechanism for controlling the leaves;

Fig. 7 is an elevation, partly in section;

Fig. 8 is a plan view of a fitting;

Fig. 9 is a vertical sectional view thereof;

Fig. 10 is a plan view of a gear that is rotatable with the wings;

Fig. 11 is a vertical sectional view of the leaf-control rotatable member;

Fig. 12 is a fragmentary elevation showing a leaf-latch mechanism;

Fig. 13 is a fragmentary detail plan view of the latch mechanism;

Fig. 14 is a plan view of a door having sliding leaves;

Fig. 15 is a side elevation of a closure member of such a door;

Fig. 16 is an end elevation thereof;

Fig. 17 is a fragmentary horizontal sectional view on the line 17—17, Fig. 15;

Fig. 18 is a view of a hinge connecting a leaf and wing; and

Fig. 19 is a fragmentary horizontal sectional view on the line 19—19, Fig. 18.

Figure 1:
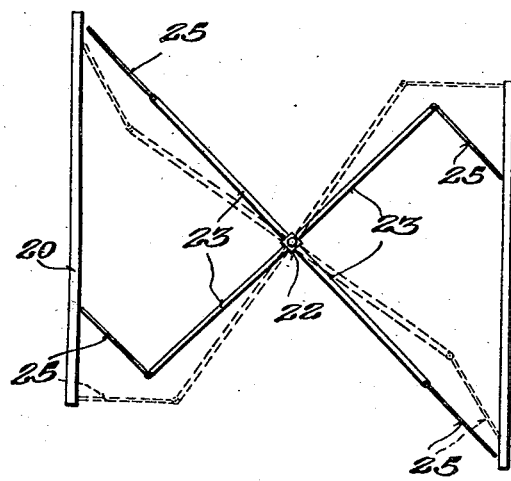
Fig. 1 is a plan view of an arrangement in which the leaves, when not moving in closing cooperation with the side walls, are in substantially the same planes as the wings.

Having more particular reference to the drawings, 20 designates substantially straight and parallel side-walls of a passageway, such as of a doorway. Such walls are shown in connection with the explanation herein of the revolving door provided by the invention, which is arranged to close and to keep closed such a passageway and at the same time to permit movement of persons in both directions therethrough. The side-walls referred to herein may be of a building in which the passageway is located or of a housing in the passageway provided for the door.

A socket 21 in the floor of the passageway between the side-walls has an upright rotatable member 22 stepped therein, another socket being provided to take the upper end of the member. The member 22 carries a plurality of radially-disposed revoluble wings 23, which when in use are maintained at definite angular intervals by members 24 in a manner common in the art.

Each wing carries a leaf 25 arranged to cooperate at its outer or free edge with the side walls in closing the passageway. The leaves, except as shown by Figs. 14, 15, 16, and 17, are mounted swingably on spring hinges 26 at the outer edges of the wings, the hinges being adjustable to cause the leaves to have a tendency to assume the same normal positions when not in cooperative relation to the side walls.

A wing and its leaf constitute a contractile closure member that is wider than the distance between the axis and the side walls, in order that the outer edges of the closure members may come into contact with, or into close proximity to, substantially straight side walls during their revolution and remain in such relation long enough to keep the passageway closed.

Such an arrangement of closure members make unnecessary the association with a revolving door of circular walls such as are required with non-contractile closure members, it permits employment of straight or substantially straight side-walls and of side walls curved otherwise than concentrically to the door-axis, and it makes it possible to use shorter side-walls than are required for non-contractile closure members.

As seen in Fig. 1, which illustrates in simple form the cooperation of wings, leaves, and side-walls, at least two leaves, one on each side of the axis, are at all times in closing cooperation with the side-walls. During revolution of the door, a leaf at the time of its first contact with a side-wall or arrival in close proximity thereto, extends in substantially the same plane as its wing. Thereafter, as the wing continues to move, the leaf swings backwardly, as it is permitted to do by the resilient means having a tendency to keep it extended straight from the wing, and it trails along the side wall or moves with its outer edge in close proximity to that wall. When a leaf reaches the other end of the side-wall, or when its wing has arrived at such position that it will withdraw the leaf from cooperative relation with the side-wall, the leaf resumes its straight extended position, in which it is ready for early cooperation with the opposite side-wall.

In order to prevent a leaf, during revolution of the door, from striking too forcibly against a side-wall as it comes into closing cooperation therewith, and also otherwise to control it, each leaf may be provided with a roller 27 or other suitable guide member arranged to cooperate with guides. As seen in the diagrammatic view of Fig. 2, the member 27 extends upwardly from the leaf at or near its outer edge, and a guide 28 suitably fixed above each side of the passageway is so curved and positioned as to impart a slight rearward swing to the leaf just before or at about the time it otherwise would strike the side-wall. Thus the force of movement against the side-wall is reduced or entirely eliminated, in accordance with the way the guide is set. In the event it is desired that the leaf shall move in close proximity to the side-wall, but out of actual contact therewith, or where the outer edge of the leaf carries flexible material that trails along the side-wall and it is desired to control the pressure thereof against the wall, the guide 28 is disposed so that the member 27 moves thereagainst during the period of traverse of the leaf in closing cooperation with the side-wall.

For the purpose of preventing a leaf from too suddenly returning to extended or other normal position at the time it ceases cooperation with a side-wall, the guide 28 is extended beyond that point and so curved that the member 27 in contact therewith will permit only gradual return of the leaf.

Figure 2:
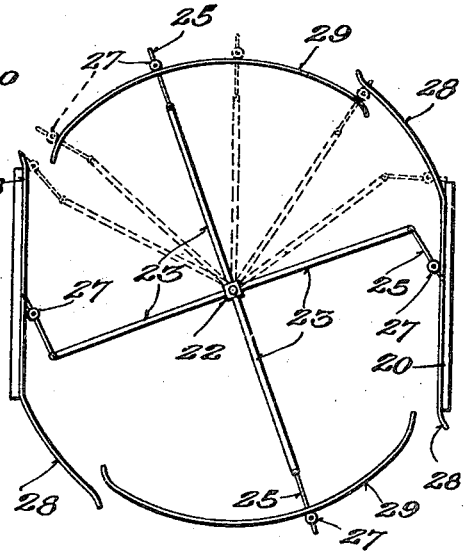
Fig. 2 is a plan view illustrative of guides for the leaves.
Figure 3:
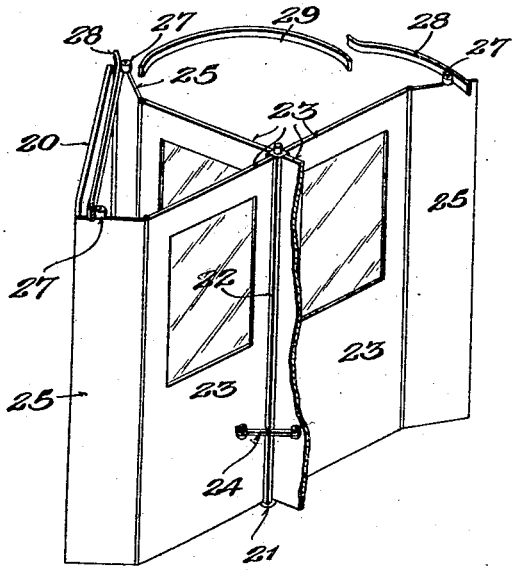
Fig. 3 is a perspective view, certain parts being omitted.
Figure 4:
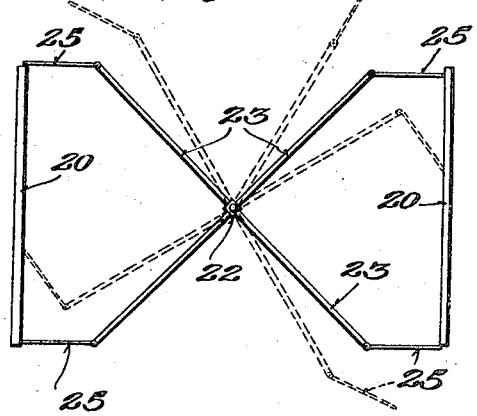
Fig. 4 is a plan view of an arrangement in which the leaves afford prolonged periods of closing cooperation with the side-walls.

In order to cause the leaves to come to closing positions with respect to the side-walls at times earlier than they do when they are straight out from the wings while moving from one side of the passageway to the other, the invention provides means for deflecting the leaves at proper times in the direction of revolution of the door, as seen in the diagrammatic views of Figs. 2, 4, and 5.

One method of so deflecting the leaves is so to tension the resilient control means of the springs 26 that during movement from one side of the passageway toward the other, when the leaves are out of cooperative relation to the side-walls, they will have a tendency to assume positions at an angle with respect to the wings, as seen in Figs. 2, 4, and 5. Leaves so arranged may have members 27 and guides 28 associated therewith, which act in the manner and for the purposes hereinbefore described.

In order to prevent a leaf from at once returning to a forwardly-deflected position after it ceases cooperative relation to a side-wall, an arcuate guide 29 is fixed so that the member 27 contacts therewith on departure of the leaf from that relation, as seen in Fig. 2. The guide 29 is shaped in such manner that it permits a leaf gradually to return to a forwardly-deflected position by the time it comes into cooperative relation to the other side-wall.

Other means for more positively controlling action of the leaves are shown by Figs. 6 to 13, inclusive, to which reference now is had.

A supporting member 30 is located above the wings and fixedly held by the structure in which the door is installed. It carries a fitting 31 that includes a cross member 32 having a socket 33, in which is disposed the upper end of the axial member 22. The sockets 21 and 33 may be disposed midway between the side-walls, when it is desired to have equal passageways on each side thereof, or they may be located nearer one side-wall than the other when it is desired to have a wider passageway at one side than the other, such location being permitted within reasonable ranges by the contractile closure members. The fitting has below the socket an annular flange 34, with which the socket and axial member are eccentric.

A wheel or annular plate 35 has a hub 36, the upper end portion of which extends into the fitting, which is the journal for the hub. The hub has an annular flange 37, which rests on the flange 34 of the fitting. The wheel or plate thus is mounted rotatably above the wings and eccentrically with respect to the axial member 22.

The other or lower portion of the hub has an exteriorly-toothed pinion 38, which is positioned slightly below the plane of the wheel or plate 35. An internally-toothed gear 39, larger than the pinion 38, is in mesh therewith, and it is secured to the wings 23 or to the axial member to rotate at the same speed therewith, and it is concentric with that member. The gear and pinion arrangement thus is such that, as revoluble movement is given the wings, faster rotary movement is imparted to the wheel or plate. The wheel or plate has near its periphery a plurality of radially-disposed guideways, preferably equally spaced from one another, which guideways in the present embodiment of the invention are afforded by slots 40.

Each of the leaves 25 carries a latch mechanism that is cooperable with those guideways. The latch includes a guide member 41 arranged to cooperate with any of the guideways 40. Each member 41 is reciprocable upwardly and downwardly in, and is held by, a strap 42 on the side of its leaf, and is the upward extension of an arm 43 extending from a rod 44 reciprocable in straps 45 on the side of the leaf. The parts 41, 43, and 44 preferably are of integral formation. A spring 46 associated with the rod 44 yieldably holds the member 41 in cooperative relation with the wheel or plate and it also maintains the upper end of the rod above the upper edge of the leaf.

A track or guide 47 extends along each side-wall 20 in such position as to be contacted by the upper ends of the rods 44 during the periods the leaves 25 are moving in cooperative relation with the side-walls. The members 47 are inclined upwardly at their ends, as shown at 48; they are disposed so that, when the upper ends of the rods 44 come into contact with the front inclined ends 48, they will be depressed and the member 41 withdrawn from cooperation with the guideways 40; and the members 47 will keep the members 41 out of cooperation with the guideways while the rods are traveling in contact with a member 47. When a rod reaches the rear end of a member 47, the upturned rear end of that member will permit the rod to be moved upwardly by its spring 46 and the member 41 again into contact with the wheel or plate 35. Thereafter, the spring will move the member 41 into cooperation with the first guideway 40 that reaches it.

The door being revolved by persons moving through the passageway, the larger gear 39, being attached to the wings or to the axial member 22, rotates at the same speed as the wings, and it imparts faster rotation to the wheel or plate 35 through the instrumentality of the smaller pinion 38. Therefore, when the member 41 of a leaf comes into cooperation with a guideway 40, the leaf is swung forwardly on its wing. The ratio between the gear and pinion is such, for every particular door and the passageway it closes, that a leaf, after departure from cooperative relation with one side-wall, will come to the forwardly-deflected position required for that installation by the time it reaches cooperative relation with the other side-wall.

Thereupon, the leaf is released from control of the wheel or plate by removal of its member 41 from cooperation with a guideway 40 on depression of that member by a guide 47. Then, of course, the leaf is free to move with respect to the side-wall, either freely as shown by the form disclosed by Fig. 1 or in cooperation with a guide 28 such as disclosed by Fig. 2. When a leaf has reached the point of departure from closing relation to the side-wall, the rod 44 runs off the guide 47, and the member 41 then is free to be pressed by the spring 46 into cooperative relation to the next guideway 40 that reaches it.

The leaves, which are yieldably held in closing cooperation with the side-walls, are free during the cooperative periods to be swung backwardly—that is, in a direction opposite to that of revolution of the door and of the traffc. Thus, when clothing or other articles or parts become caught between a leaf and a wall, release thereof easily may be effected; and, moreover, if revolution of the door is stopped, persons that may find themselves between two closure members may extricate themselves. In order to keep the guide members 41 and rods 44 depressed and thus prevent their engagement with the wheel or plate on retrograde swinging of leaves to release persons, their clothing, or other parts or articles, the track or guide 47 may be widened intermediately of its ends, or a plate 49 may be positioned adjacent thereto to keep the leaf-latch mechanism depressed.

Another form of contractile closure member is disclosed by Figs. 14, 15, 16, and 17. In that form the leaves are mounted slidably on the wings. A wing and its leaf may be associated slidably in any suitable manner, as, for example, as shown in the drawings.

Therein, two or more pairs of elongated members 50 are interposed horizontally between the two parts, one pair near the top and the other near the bottom of the closure member. Each of the members 50 is substantially of Z shape—that is, with an intermediate web and flanges extending oppositely from opposite edges of the web. In each pair of such members, one of them is secured to the wing and the other to the leaf, and anti-friction balls 51 are interposed between them. The leaf is held yieldably in extended position by springs 52. In order to prevent passage of air-currents between the wing and leaf, a strip of flexible material 53 is interposed between and attached to one or the other of them.

Slidably-mounted leaves may act in a manner similar to the leaves of the form by Fig. 1—that is, they may contract and extend without assistance of guides on coming into contact with and leaving side-walls. They also may be provided with rollers or other suitable guide members 27 arranged to cooperate with guides 28, as in the case of the form disclosed by Fig. 2; or the springs 52 may be omitted and curved and grooved guides 54 provided, as shown by Fig. 14, to receive the guide members 27, and they are contoured to cause the leaves to extend and contract at proper times during revolution of the wings.

Having thus described my invention, what I claim as new, and desire to secure by Letters Patent, is—

1. The combination, with side-walls of a passageway, of a revolving door therebetween comprising wings and leaves movably mounted thereon arranged to have closing cooperation with said side-walls in positions different with respect to said wings from those assumed when out of said cooperation, means having a tendency to restrain movement of said leaves relatively to said wings, and members preventing sudden movement of said leaves.

2. The combination, with side-walls of a passageway, of a revolving door therebetween comprising wings and leaves movably mounted thereon arranged to have closing cooperation with said side-walls in positions different with respect to said wings from those assumed when out of said cooperation, means having a tendency to restrain movement of said leaves relatively to said wings, and guide members and guides preventing sudden movement of said leaves.

3. The combination, with side-walls of a passageway, of a revolving door therebetween comprising wings and leaves swingably mounted thereon arranged to have closing cooperation with said side-walls in positions different with respect to said wings from those assumed when out of said cooperation, means having a tendency to restrain movement of said leaves relatively to said wings to side-wall-cooperating positions, and members preventing sudden movement of said leaves from said cooperating positions.

4. A passageway-closure apparatus comprising revolubly-mounted wings, leaves swingably mounted thereon, and means whereby the planetary relation between said wings and leaves is altered during revoluble movement of said wings.

5. The combination, with side-walls of a pasageway, of a revolving door therebetween comprising wings and leaves swingably mounted thereon, and means whereby said leaves are caused to approach said walls in forwardly-swung positions.

6. The combination, with side-walls of a passageway, of a revolving door therebetween comprising wings and leaves swingably mounted thereon, means whereby said leaves are caused to approach said walls in forwardly-swung positions, and guides and guide members arranged to impart rearwardly-swinging movement to said leaves as they reach said side-walls.

7. The combination, with side-walls of a passageway, of a revolving door therebetween comprising wings and leaves swingably mounted thereon arranged to assume backwardly-swung positions during movement in proximity to said walls, and a member arranged to move said leaves to forwardly-swung positions during their traverse from one side-wall to the other.

8. The combination, with side-walls of a passageway, of a revolving door therebetween comprising wings and leaves swingably mounted thereon, guides and guide members arranged to impart rearwardly-swinging movement to said leaves as they reach said side-walls, and a member arranged to move said leaves to forwardly-swung positions during their traverse from one side-wall toward the other.

9. The combination, with side-walls of a passageway, of a revolving door therebetween comprising wings and leaves swingably mounted thereon, guide members on said leaves, a rotatable member having guideways arranged to cooperate with said guide members, means whereby said rotatable member is rotated faster than said wings, and guides arranged to release and maintain said guide members from cooperation with said guideways during movement of said leaves in proximity to said side-walls.

10. The combination, with side-walls of a passageway, of a revolving door therebetween comprising wings and leaves swingably mounted thereon, guide members on said leaves, a rotatable member having guideways arranged to cooperate with said guide members, a gear rotated with said wings and a pinion in mesh with said gear arranged to rotate said rotatable member, the ratio of said gear and pinion being such that said rotatable member is rotated faster than said wings, and guides arranged to release and maintain said guide members from cooperation with said guideways during traverse of said leaves in proximity to said walls.

11. The combination, with side-walls of a passageway, of a revolving door therebetween comprising wings and leaves swingably mounted thereon, guide members on said leaves, a journal member, a rotatable member having a hub rotatably supported by said journal member, a pinion on said hub, a gear in mesh with said pinion rotatable with said wings, the ratio of said gear and pinion being such that said rotatable member is rotated faster than said wings, and guides arranged to release and maintain said guide members from cooperation with said guideways during traverse of said leaves in proximity to said walls.

12. The combination, with side-walls of a passageway, of a revolving door therebetween comprising wings and leaves swingably mounted thereon, yieldable guide members on said leaves, a rotatable member having guideways cooperable with said guide members, means whereby said rotatable member is rotated faster than said wings, and guides extending along said side-walls arranged to release and maintain said guide members from cooperation with said guideways during movement of said leaves in proximity to said walls.

13. The combination, with side-walls of a passageway, of a revolving door therebetween comprising wings and leaves swingably mounted thereon, spring-controlled guide members on said leaves, a rotatable member having radial guideways arranged to receive said guide members, means whereby said rotatable member is rotated faster than said wings, and guides arranged to release and maintain said guide members from said guideways during traverse of said leaves in proximity to said walls.

14. The combination, with side-walls of a passageway, of a revolving door therebetween comprising wings and leaves swingably mounted thereon, a rotatable member having radial guideways near its periphery, means whereby said rotatable member is rotated faster than said wings, reciprocable rods on said leaves, guide members controlled by said rods arranged to be received by said guideways, springs associated with said rods yieldably holding said guide members in said guideways, and guides arranged to be engaged by said rods and to release said guide members from said guideways during traverse of said leaves in proximity to said walls.

15. The combination, with side-walls of a passageway, of a revolving door therebetween comprising wings and leaves swingable thereon, means whereby said leaves are maintained normally in certain planes with respect to said wings, and said leaves being arranged to swing rearwardly from those planes during their movement in proximity to said side walls.

16. The combination, with side-walls of a passageway, of a revolving door therebetween comprising wings and leaves swingably mounted thereon, and means whereby said leaves are caused to approach said walls in forwardly-swung positions, said leaves being capable of rearwardly-swinging movement during their traverse in proximity to said side-walls.

In testimony whereof I affix my signature.

JACOB M. FRIEDLAND.